(12) United States Patent
Sugimoto et al.

(10) Patent No.: US 7,361,409 B2
(45) Date of Patent: Apr. 22, 2008

(54) MICROSTRUCTURED ARTICLE COMPRISING A POLYMERIZED COMPOSITION HAVING LOW GLASS TRANSITION TEMPERATURE

(75) Inventors: Takaki Sugimoto, Komae (JP); Clinton L Jones, Somerset, WI (US); Brant U Kolb, Afton, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 11/276,118

(22) Filed: Feb. 15, 2006

(65) Prior Publication Data

US 2006/0187366 A1 Aug. 24, 2006

Related U.S. Application Data

(63) Continuation-in-part of application No. 10/595,088, filed as application No. PCT/US2004/026845 on Aug. 18, 2004.

(60) Provisional application No. 60/653,784, filed on Feb. 17, 2005.

(30) Foreign Application Priority Data

Aug. 22, 2003 (JP) ............................. 2003-208433

(51) Int. Cl.
  *B32B 27/08* (2006.01)
  *B32B 27/42* (2006.01)
(52) U.S. Cl. .................. 428/500; 428/1.1; 428/504
(58) Field of Classification Search ............ 428/411.1, 428/500, 1.1, 504
See application file for complete search history.

(56) References Cited

U.S. PATENT DOCUMENTS

| 4,929,403 | A | 5/1990 | Audsley |
| 6,449,413 | B1 | 9/2002 | Duecker |
| 6,833,176 | B2 | 12/2004 | Chisholm et al. |
| 6,844,950 | B2 | 1/2005 | Ja Chisholm et al. |
| 7,074,463 | B2 * | 7/2006 | Jones et al. .................. 428/1.1 |
| 7,179,513 | B2 * | 2/2007 | Jones et al. .................. 428/1.5 |
| 2006/0204676 | A1 | 9/2006 | Jones et al. |

FOREIGN PATENT DOCUMENTS

| EP | 0836892 | 4/1998 |
| EP | 1 014 113 | 6/2000 |
| JP | 8273538 | 2/1997 |
| WO | WO 00/39829 | 7/2000 |
| WO | WO 00/69941 | 11/2000 |
| WO | WO 01/52299 | 7/2001 |
| WO | WO2004/007166 | 1/2004 |
| WO | WO2004/010452 | 1/2004 |
| WO | WO2004/062870 | 7/2004 |
| WO | WO 2005/021260 | 3/2005 |
| WO | WO 2006/088930 | 8/2006 |
| WO | WO 2006/099168 | 9/2006 |

OTHER PUBLICATIONS

Tarasiuk B. et al., "Urethane-Acrylates as Main Components of Lacquers for Protective Coating of Some Materials"; Molecular Crystals and Liquid Crystals Science and Technology. Section A; Molecular Crystals and Liquid Crystals, Gordon and Breach Publishers, CH; vol. 354, Jun. 2000, pp. 49-53.
Podkoscielny W. et al., "Urethane-Acrylate Compositions Cured by UV Radiation as Intermediate Protective Covers of Optical Fibers"; Angewandte Markromolekulare Chemie, Applied Macromolecular Chemistry and Physics, Wiley VCH, Weinheim, DE, vol. 242, Nov. 1996, pp. 123-138.
Pending U.S. Appl. No. 11/276,691, filed Mar. 10, 2006.
U.S. Appl. No. 60/653,784, filed Feb. 17, 2005.

* cited by examiner

*Primary Examiner*—Shean C Wu
(74) *Attorney, Agent, or Firm*—Carolyn A. Fischer

(57) ABSTRACT

An article comprising a microstructured surface, wherein the microstructures compris the reaction product of a of a polymerizable composition comprising at least one oligomer or monomer that comprises at least two (meth)acrylate groups and at least one monofunctional (meth)acryl monomer and the reaction product has a glass transition temperature of less than 35° C.

16 Claims, 6 Drawing Sheets

MICROSTRUCTURED ARTICLE COMPRISING A POLYMERIZED COMPOSITION HAVING LOW GLASS TRANSITION TEMPERATURE

CROSS-REFERENCE TO RELATED APPLICATIONS

This application in a continuation-in-part application of Ser. No. 10/595088, filed Jul. 10, 2006, which is a 371 national stage of PCT/US04/26845, filed Aug. 18, 2004, which claims priority to JP Application No. 2003-208433, filed Aug. 22, 2003, and this application claims priority to provisional application Ser. No. 60/653784, filed Feb. 17, 2005.

BACKGROUND

Certain microreplicated optical products, such as described in U.S. Pat. Nos. 5,175,030 and 5,183,597, are commonly referred to as a "brightness enhancing films". Brightness enhancing films are utilized in many electronic products to increase the brightness of a backlit flat panel display such as a liquid crystal display (LCD) including those used in electroluminescent panels, laptop computer displays, word processors, desktop monitors, televisions, video cameras, as well as automotive and aviation displays.

Brightness enhancing films desirably exhibit specific optical and physical properties including the index of refraction of a brightness enhancing film that is related to the brightness gain (i.e. "gain") produced. Improved brightness can allow the electronic product to operate more efficiently by using less power to light the display, thereby reducing the power consumption, placing a lower heat load on its components, and extending the lifetime of the product.

Brightness enhancing films have been prepared from high index of refraction monomers that are cured or polymerized, as described for example in U.S. Pat. Nos. 5,908,874; 5,932,626; 6,107,364; 6,280,063; 6,355,754; as well as EP 1 014113 and WO 03/076528.

Although various polymerizable compositions that are suitable for the manufacture of brightness enhancing films are known, industry would find advantage in alternative compositions.

SUMMARY

Articles comprising a microstructured surface are described.

In one embodiment, the microstructures comprise the reaction product of a of a polymerizable composition comprising at least one oligomer or monomer that comprises at least two (meth)acrylate groups and at least one monofunctional (meth)acryl monomer; wherein the reaction product has a glass transition temperature of less than 35° C.

In another embodiment, the microstructures comprise the reaction product of a of a polymerizable composition comprising at least one oligomer or monomer that comprises at least two (meth)acrylate groups and at least one monofunctional (meth)acryl monomer; wherein the reaction produce has a glass transition temperature of less than 0° C.

BRIEF DESCRIPTION OF THE DRAWINGS

The invention may be more completely understood in consideration of the following detailed description of various embodiments of the invention in connection with the accompanying drawings, in which.

Figure 1:
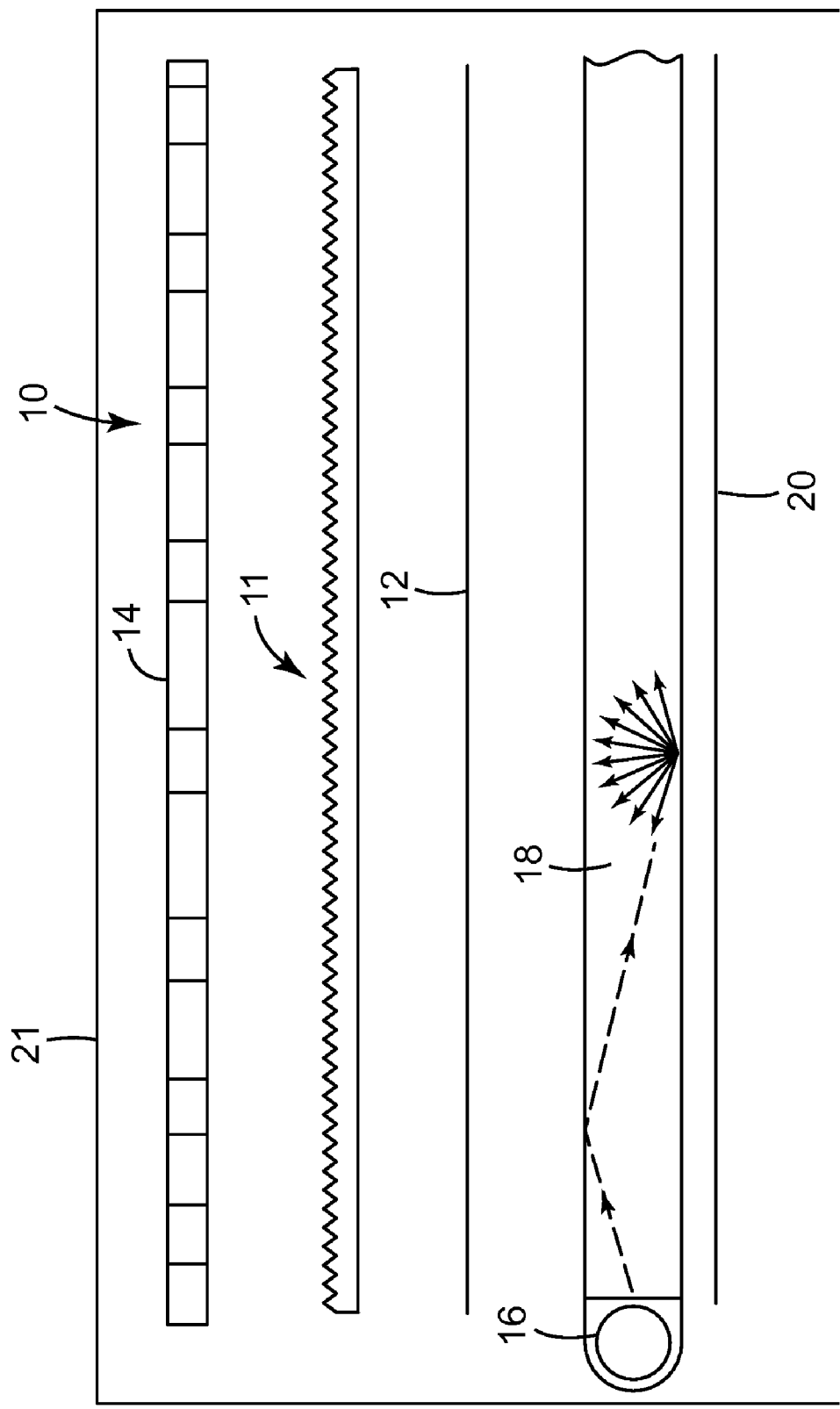
FIG. 1 is a schematic view of an illustrative microstructured article of the present invention in a backlit liquid crystal display.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Brightness enhancing films generally enhance on-axis luminance (referred herein as "brightness") of a lighting device. Brightness enhancing films can be light transmissible, microstructured films. The microstructured topography can be a plurality of prisms on the film surface such that the films can be used to redirect light through reflection and refraction. When used in an optical display such as that found in laptop computers, watches, etc., the microstructured optical film can increase brightness of an optical display by limiting light escaping from the display to within a pair of planes disposed at desired angles from a normal axis running through the optical display. As a result, light that would exit the display outside of the allowable range is reflected back into the display where a portion of it can be "recycled" and returned back to the microstructured film at an angle that allows it to escape from the display. The recycling is useful because it can reduce power consumption needed to provide a display with a desired level of brightness.

Retro-reflective films generally are capable of returning a significant percentage of incident light at relatively high entrance angles regardless of the rotational orientation of the sheeting about an axis perpendicular to its major surface. Cube corner retro-reflective film can include a body portion typically having a substantially planar base surface and a structured surface comprising a plurality of cube corner elements opposite the base surface. Each cube corner element can include three mutually substantially perpendicular optical faces that typically intersect at a single reference point, or apex. The base of the cube corner element acts as an aperture through which light is transmitted into the cube corner element. In use, light incident on the base surface of the sheeting is refracted at the base surface of the sheeting, transmitted through the respective bases of the cube corner elements disposed on the sheeting, reflected from each of the three perpendicular cube corner optical faces, and redirected toward the light source, as described in U.S. Pat. No. 5,898,523, which is incorporated by reference herein.

For the following defined terms, these definitions shall be applied, unless a different definition is given in the claims or elsewhere in this specification.

The term "polymer" will be understood to include polymers, copolymers (e.g., polymers formed using two or more different monomers), oligomers and combinations thereof, as well as polymers, oligomers, or copolymers that can be formed in a miscible blend by, for example, coextrusion or reaction, including transesterification. Both block and random copolymers are included, unless indicated otherwise.

The term "refractive index" is defined herein as the absolute refractive index of a material that is understood to be the ratio of the speed of electromagnetic radiation in free space to the speed of the radiation in that material. The refractive index can be measured using known methods and is generally measured using an Abbe Refractometer in the visible light region.

The term "colloidal" is defined herein to mean particles (primary particles or associated primary particles) with a diameter less than about 100 nm.

The term "associated particles" as used herein refers to a grouping of two or more primary particles that are aggregated and/or agglomerated.

The term "aggregation" as used herein is descriptive of a strong association between primary particles that may be chemically bound to one another. The breakdown of aggregates into smaller particles is difficult to achieve.

The term "agglomeration" as used herein is descriptive of a weak association of primary particles that may be held together by charge or polarity and can be broken down into smaller entities.

The term "primary particle size" is defined herein as the size of a non-associated single particle.

The term "sol" is defined herein as a dispersion or suspension of colloidal particles in a liquid phase.

The term "surface modified colloidal nanoparticles" refers to nanoparticles, each with a modified surface such that the nanoparticles provide a stable dispersion.

The term "stable dispersion" is defined herein as a dispersion in which the colloidal nanoparticles do not agglomerate after standing for a period of time, such as about 24 hours, under ambient conditions—e.g. room temperature (about 20-22° C.), atmospheric pressure, and no extreme electromagnetic forces.

The term "gain" is defined herein as a measure of the improvement in brightness of a display due to a brightness enhancing film, and is a property of the optical material, and also of the geometry of the brightness enhancing film. Typically, the viewing angle decreases as the gain increases. A high gain is desired for a brightness enhancing film because improved gain provides an effective increase in the brightness of the backlight display.

The term "microstructure" is used herein as defined and explained in U.S. Pat. No. 4,576,850. Thus, it means the configuration of a surface that depicts or characterizes the predetermined desired utilitarian purpose or function of the article having the microstructure. Discontinuities such as projections and indentations in the surface of said article will deviate in profile from the average center line drawn through the microstructure such that the sum of the areas embraced by the surface profile above the center line is equal to the sum of the areas below the line, said line being essentially parallel to the nominal surface (bearing the microstructure) of the article. The heights of said deviations will typically be about +/−0.005 to +/−750 microns, as measured by an optical or electron microscope, through a representative characteristic length of the surface, e.g., 1-30 cm. Said average center line can be piano, concave, convex, aspheric or combinations thereof. Articles where said deviations are of low order, e.g., from +/−0.005 to +/−0.1 or, preferably, to +/−0.05 microns, and said deviations are of infrequent or minimal occurrence, i.e., the surface is free of any significant discontinuities, are those where the microstructure-bearing surface is an essentially "flat" or "smooth" surface, such articles being useful, for example, as precision optical elements or elements with a precision optical interface, such as ophthalmic lenses. Articles where said deviations are of low order and of frequent occurrence include those having anti-reflective microstructure. Articles where said deviations are of high-order, e.g., from +/−0.1 to +/−750 microns, and attributable to microstructure comprising a plurality of utilitarian discontinuities which are the same or different and spaced apart or contiguous in a random or ordered manner, are articles such as retroreflective cube-corner sheeting, linear Fresnel lenses, video discs and light management films. The microstructure-bearing surface can contain utilitarian discontinuities of both said low and high orders. The microstructure-bearing surface may contain extraneous or non-utilitarian discontinuities so long as the amounts or types thereof do not significantly interfere with or adversely affect the predetermined desired utilities of said articles. It may be necessary or desirable to select a particular oligomeric composition whose shrinkage upon curing does not result in such interfering extraneous discontinuities, e.g., a composition which shrinks only 2-6%.

The recitation of numerical ranges by endpoints includes all numbers subsumed within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. Thus, for example, reference to a composition containing "a compound" includes a mixture of two or more compounds. As used in this specification and the appended claims, the term "or" is generally employed in its sense including "and/or" unless the content clearly dictates otherwise.

Unless otherwise indicated, all numbers expressing quantities of ingredients, measurement of properties and so forth used in the specification and claims are to be understood as being modified in all instances by the term "about."

Presently described are microstructured articles. The microstructures of the microstructured layer are formed from the reaction product of a polymerizable composition comprising an organic phase having at least one (meth) acrylate oligomer and at least one (meth)acryl monomer as main components. The polymerizable composition may optionally further comprise inorganic nanoparticles. The polymerizable composition is preferably a substantially solvent-free radiation curable, optionally inorganic filled, organic composite. The organic phase typically has a refractive index of at least 1.50 for some end uses, and a refractive index of at least 1.56 for other end uses. High transmittance in the visible light spectrum is also typically preferred. The organic phase of the polymerizable compositions can have a melting point that is below about 50° C. The organic phase is preferably a liquid at room temperature.

The organic phase is preferably polymerizable to a cured material having a relatively low glass transition temperature (Tg). The glass transition temperature can be measured by methods known in the art, such as Differential Scanning Calorimetry (DSC), modulated DSC, or Dynamic Mechanical Analysis (DMA). As used herein, Tg, was measured by DMA a frequency 1 Hz stipulated in JIS K7244-1 (equivalent to ISO 6721-1: 1994, Plastics-Determination of Dynamic Mechanical Properties, Part 1: General Principals). It is appreciated that the Tg and elongation values reported by the supplier typically vary to some extent depending on the test method employed. The polymerizable composition can be polymerized by known methods such as conventional free radical polymerization methods. The Tg of the cured organic phase (i.e. without inorganic nanoparticles) is typically less than 35° C., less than 30° C., less than 25° C., less than 20° C. less, less than 15° C., less than 10° C., less than 5° C. or less than 0° C. The Tg of the cured organic phase is typically at least about −60° C. The polymerizable organic phase can be polymerized to form a "soft" resin. The term "soft resin" means that the resulting polymer can exhibit an elongation at break of at least 50% when evaluated according to the ASTM D-882-91 procedure. The soft resin polymer also can exhibit a tensile modulus of less than 100 kpsi (6.89×10$^8$ pascals) when evaluated according to the ASTM D-882-91 procedure.

In some embodiments, the polymerizable composition comprising nanoparticles is polymerized to a cured material having a glass transition temperature that is greater than 45° C. The polymerizable composition comprising nanoparticles can be a harder resin than the organic phase alone. The term "hard resin" means that the resulting polymerized composition exhibits an elongation at break of less than 50%, less than 40%, less than 30%, less than 20%, less than 10%, or less than 5 percent when evaluated according to the ASTM D-882-91 procedure. The hard polymerized resin also can exhibit a tensile modulus of greater than 100 kpsi (6.89×10$^8$ pascals) when evaluated according to the ASTM D-882-91 procedure.

The polymerizable composition comprises a blend of at least one (meth)acrylate monomer or oligomer that is at least difunctional in combination with at least one (meth)acrylate monofunctional monomer diluent. The homopolymer of at least one of the ingredients has a Tg of less than 35° C. in order that the polymerized organic phase has a Tg of less than 35° C. as previously described. In some embodiments, the difunctional monomer or oligomer has a Tg of less than 35° C.; while the Tg of a homopolymer of the diluent may be greater than 35° C. In other embodiments, the (meth) acrylate monofunctional monomer diluent has a Tg of less than 35° C.; while the Tg of a homopolymer of the difunctional monomer or oligomer is greater than 35° C. In yet other embodiments, the organic phase comprises both a difunctional monomer or oligomer and a monofunctional diluent, each having a Tg of less than 35° C.

In some embodiments, the (meth)acryl monomer(s) and (meth)acrylate oligomer(s) have a glass transition temperature (Tg) of about −80° C. to about 0C, respectively, meaning that the homopolymers thereof have such glass transition temperatures. Examples of (meth)acryl monomers having a glass transition temperature of about −80° C. to about 0° C. and suitable for forming the microstructured layer include for example polyether acrylate, polyester acrylate, acrylic acid ester, etc. The (meth)acryl oligomer having a glass transition temperature of about −80° C. to about 0° C. and suitable for forming the microstructured layer include for example urethane acrylate oligomer, polyether acrylate oligomer, polyester acrylate oligomer, epoxy acrylate oligomer, etc.

Various urethane (meth)acrylate oligomers are commercially available from Cognis under the trade designation "Photomer 6000 Series". One exemplary urethane acrylate (reported by Cognis to have a Tg of 32° C. and elongation of 40%) is commercially available from Cognis Corporation under the trade designation "Photomer 6210". Another exemplary urethane acrylate (reported by Sartomer to have a Tg of −33° C. and elongation of 238%) is commercially available from Sartomer Co., Exton, Pa. under the trade designation "CN966J75". Other (e.g. aliphatic) urethane diacrylate are commercially available from Cognis under the trade designations "Photomer 6010" (reported to have a viscosity of 5,900 mPa·s at 60° C., elongation of 45% and a Tg of −7° C.); "Photomer 6217" and "Photomer 6230" (both reported by Cognis to have a viscosity of 3,500 mPa·s at 60° C., an elongation of 27% and 69% respectively, and a Tg of 35° C. and 2° C. respectively); "Photomer 6891" (reported by Cognis to have viscosity of 8,000 mPa·s at 60° C., elongation of 60% and a Tg of 28° C.); and "Photomer 6893-20R" (reported to have a viscosity of 2,500 mPa·s at 60° C., an elongation of 42%, and a Tg of 41° C.). Other urethane diacrylates are commercially available from Sartomer as well as from UCB.

Bisphenol-A ethoxylated diacrylate monomer is commercially available from Sartomer under the trade designations "SR602" (reported to have a viscosity of 610 cps at 20° C. and a Tg of 2° C.).

A tetrafunctional polyester acrylate oligomer, reported by Cognis to have a Tg of −20° C. and an elongation of 10% is commercially available under the trade designation "Photomer 5430".

Epoxy acrylates, reported by UCB Chemicals to have Tg's of 8° C., −16° C., and 11° C. respectively, are commercially available from UCB Chemicals under the trade designations "Ebecryl 3201", "Ebecryl 3211", and "Ebecryl 3213" respectively.

An acrylic acrylate, reported by UCB Chemicals to have a Tg of −9° C. is commercially available from UCB Chemicals under the trade designation "1701-TP20".

The (meth)acryl monomers are preferably mono-ethylenically unsaturated monomers such as (meth)acrylates or monomeric N-substituted or N,N-disubstituted (meth)acrylamides, especially an acrylamide. These include N-alkylacrylamides and N,N-dialkylacrylamides, especially those containing $C_{1-4}$ alkyl groups. Examples are N-isopropylacrylamide, N-t-butylacrylamide, N,N-dimethylacrylamide, N,N-diethylacrylamide, N-vinyl pyrrolidone and N-vinyl caprolactam.

Preferred monofunctional (meth)acryl monomers can have a refractive index greater than 1.50 (e.g. greater than 1.55. Such monomers can be halogenated or non-halogenated (e.g. non-brominated). Suitable monomers typically have a number average molecular weight no greater than 450 g/mole.

Suitable monofunctional (meth)acryl monomers include for example phenoxy ethyl(meth)acrylate; phenoxy-2-methylethyl(meth)acrylate; phenoxyethoxyethyl (meth)acrylate, 3-hydroxy-2-hydroxypropyl(meth)acrylate; benzyl(meth) acrylate, 4-(1-methyl-1-phenethyl)phenoxyethyl(meth)acrylate; phenylthio ethyl acrylate; 2-naphthylthio ethyl acrylate; 1-naphthylthio ethyl acrylate; 2,4,6-tribromophenoxy ethyl acrylate; 2,4-dibromophenoxy ethyl acrylate; 2-bromophenoxy ethyl acrylate; 1-naphthyloxy ethyl acrylate; 2-naphthyloxy ethyl acrylate; phenoxy 2-methylethyl acrylate; phenoxyethoxyethyl acrylate; 3-phenoxy-2-hydroxy propyl acrylate; 2-phenylphenoxy ethyl acrylate; 4-phenylphenoxy ethyl acrylate; 2,4-dibromo-6-sec-butylphenyl acrylate; 2,4-dibromo-6-isopropylphenyl acrylate; benzyl acrylate; phenyl acrylate; 2,4,6-tribromophenyl acrylate. Other high refractive index monomers such as pentabromobenzyl acrylate and pentabromophenyl acrylate can also be employed.

Phenoxyethyl acrylate is commercially available from more than one source including from Sartomer under the trade designation "SR339"; from Eternal Chemical Co. Ltd. under the trade designation "Etermer 210"; and from Toagosei Co. Ltd under the trade designation "TO-1166". Benzyl acrylate is commercially available from AlfaAeser Corp, Ward Hill, Ma. One exemplary high index optional monomer is 2,4,6-tribromophenoxyethyl(meth)acrylate commercially available from Daiichi Kogyo Seiyaku Co. Ltd (Kyoto, Japan) under the trade designation "BR-31".

Acryl monomer(s) and (e.g. urethane) (meth)acrylate oligomer(s) described above may be employed in various combinations. The amount of the (e.g. urethane) (meth) acrylate oligomer in the organic phase can range broadly, from about 10 to about 90 wt-%, and typically preferably ranges from about 20 to about 80 wt-% of the organic phase.

The polymerizable composition of the invention can optionally include at least one crosslinking agent. The crosslinking agent comprises at least two and preferably at least three (meth)acrylate functional groups. Suitable crosslinking agents include for example hexanediol acrylate (HDDA), pentaerythritol tri(meth)acrylate, pentaerythritol tetra(meth)acrylate, trimethylolpropane tri(methacrylate), dipentaerythritol penta(meth)acrylate, dipentaerythritol hexa(meth)acrylate, trimethylolpropane ethoxylate tri(meth) acrylate, glyceryl tri(meth)acrylate, pentaerythritol propoxylate tri(meth)acrylate, and ditrimethylolpropane tetra (meth)acrylate. Any one or combination of crosslinking agents may be employed.

The crosslinking agent may be present in the polymerizable composition in an amount of at least about 2 wt-%. Typically, the amount of crosslinking agent is not greater than about 25 wt-%. The crosslinking agent may be present in any amount ranging from about 5 wt-% and about 15 wt-%.

Preferred crosslinking agents include hexanediol diacrylate (HDDA), pentaerythritol tri(meth)acrylate, pentaerythritol tetra(meth)acrylate, dipentaerythritol penta(meth)acrylate, trimethylolpropane tri(meth)acrylate, ditrimethylolpropane tetra(meth)acrylate, and mixtures thereof. Pentaerythritol triacrylate (PETA) and dipentaerythritol pentaacrylate are commercially available from Sartomer Company, Exton, Pa. under the trade designations "SR444" and "SR399LV" respectively; from Osaka Organic Chemical Industry, Ltd. Osaka, Japan under the trade designation "Viscoat #300"; from Toagosei Co. Ltd., Tokyo, Japan under the trade designation "Aronix M-305"; and from Eternal Chemical Co., Ltd., Kaohsiung, Taiwan under the trade designation "Etermer 235". Trimethylol propane triacrylate (TMPTA) and ditrimethylol propane tetraacrylate (di-TMPTA) are commercially available from Sartomer Company under the trade designations "SR351" and "SR355". TMPTA is also available from Toagosei Co. Ltd. under the trade designation "Aronix M-309". Further, ethoxylated trimethylolpropane triacrylate and ethoxylated pentaerythritol triacrylate are commercially available from Sartommer under the trade designation "SR454" and "SR494" respectively.

The UV curable polymerizable compositions comprise at least one photoinitiator. A single photoinitiator or blends thereof may be employed in the brightness enhancement film of the invention. In general the photoinitiator(s) are at least partially soluble (e.g. at the processing temperature of the resin) and substantially colorless after being polymerized. The photoinitiator may be (e.g. yellow) colored, provided that the photoinitiator is rendered substantially colorless after exposure to the UV light source.

Suitable photoinitiators include monoacylphosphine oxide and bisacylphosphine oxide. Commercially available mono or bisacylphosphine oxide photoinitiators include 2,4,6-trimethylbenzoydiphenylphosphine oxide, commercially available from BASF (Charlotte, N.C.) under the trade designation "Lucirin TPO"; ethyl-2,4,6-trimethylbenzoylphenyl phosphinate, also commercially available from BASF under the trade designation "Lucirin TPO-L"; and bis (2,4,6-trimethylbenzoyl)-phenylphosphine oxide commercially available from Ciba Specialty Chemicals under the trade designation "Irgacure 819". Other suitable photoinitiators include 2-hydroxy-2-methyl-1-phenyl-propan-1-one, commercially available from Ciba Specialty Chemicals under the trade designation "Darocur 1173" as well as other photoinitiators commercially available from Ciba Specialty Chemicals under the trade designations "Darocur 4265", "Irgacure 651", "Irgacure 1800", "Irgacure 369", "Irgacure 1700", and "Irgacure 907".

The photoinitiator can be used at a concentration of about 0.1 to about 10 weight percent. More preferably, the photoinitiator is used at a concentration of about 0.5 to about 5 wt-%. Greater than 5 wt-% is generally disadvantageous in view of the tendency to cause yellow discoloration of the brightness enhancing film. Other photoinitiators and photoinitiator may also suitably be employed as may be determined by one of ordinary skill in the art.

Surfactants such as fluorosurfactants and silicone based surfactants can optionally be included in the polymerizable composition to reduce surface tension, improve wetting, allow smoother coating and fewer defects of the coating, etc.

UV-curable polymerizable compositions of various viscosities (measured by use of a Brookfield viscometer; so-called "B viscosity") can be employed. However, the viscosity is preferably within the range of about 10 to about 35,000 cps at room temperature (about 22° C.) and further preferably within the range of about 50 to about 10,000 cps.

In some embodiments, the brightness enhancing film and polymerizable composition comprises a plurality of (e.g. colloidal) inorganic nanoparticles that are preferably surface modified. The inclusion of the inorganic nanoparticles can improve the durability. Preferably, the polymerized microstructured surface has a scratch contrast ratio value in a range of 1.0 to 1.15, or 1.0 to 1.12, or 1.0 to 1.10, or 1.0 to 1.05 as determined according to the test method described in U.S. Patent Application Publication No. 2005/0151119-A1, published Jul. 14, 2005 and U.S. patent application Ser. No. 10/938,006, filed Sep. 10, 2004; incorporated herein by reference. In the case of rounded prism apexes, the scratch contrast ratio value can range from 1.0 to 1.65, or 1.0 to 1.4, or 1.0 to 1.10.

The (e.g. surface modified colloidal) nanoparticles can be oxide particles having a primary particle size of greater than 1 nm and less than 100 nm. As used throughout, particle size refers to mean particle size. Their size measurements can be based on transmission electron microscopy (TEM). The nanoparticles can include metal oxides such as, for example, alumina, tin oxides, antimony oxides, silica, zirconia, titania, mixtures thereof, or mixed oxides thereof. Surface modified colloidal nanoparticles can be substantially fully condensed. The surface modified nanoparticles are preferably non-acssociated.

Silica nanoparticles can have a particle size from 5 to 100 nm or 10 to 30. Silica nanoparticles can be present in the brightness enhancing film in an amount from 10 to 60 wt-%, or 10 to 40 wt-% of the polymerizable composition. Silicas for use in the materials of the invention are commercially available from Nalco Chemical Co., Naperville, Ill. under the trade designation "Nalco Collodial Silicas" such as products 1040, 1042, 1050, 1060, 2327 and 2329. Suitable fumed silicas include for example, products commercially available from DeGussa AG, (Hanau, Germany) under the trade designation, "Aerosil series OX-50", as well as product numbers -130, -150, and -200. Fumed silicas are also commercially available from Cabot Corp., Tuscola, Ill., under the trade designations CAB-O-SPERSE 2095", "CAB-O-SPERSE A105", and "CAB-O-SIL M5".

Zirconia nanoparticles can have a particle size from 5 to 50 nm, or 5 to 25 nm. Zirconia nanoparticles can be present in the brightness enhancing film in an amount from 10 to 70 wt-%, or 30 to 60 wt-% of the polymerizable composition. Zirconias for use in composition and articles of the invention are available from Nalco Chemical Co. under the trade designation "Nalco OOSSOO8".

The zirconia particles can be prepared using hydrothermal technology as described in U.S. patent application Ser. No. 11/027426 filed Dec. 30, 2004; incorporated herein by reference. More specifically, a first feedstock that contains a zirconium salt is subjected to a first hydrothermal treatment to form a zirconium-containing intermediate and a byproduct. A second feedstock is prepared by removing at least a portion of the byproduct formed during the first hydrothermal treatment. The second feedstock is then subjected to a second hydrothermal treatment to form a zirconia sol that contains the zirconia particles. The first feedstock is prepared by forming an aqueous precursor solution that contains a zirconium salt. The anion of the zirconium salt is usually chosen so that it can be removed during subsequent steps in the process for preparing the zirconia sol. Additionally, the anion is often chosen to be non-corrosive, allowing greater flexibility in the type of material chosen for the processing equipment such as the hydrothermal reactors.

Titania, antimony oxides, alumina, tin oxides, and/or mixed metal oxide nanoparticles can have a particle size or associated particle size from 5 to 50 nm, or 5 to 15 nm, or 10 nm. Titania, antimony oxides, alumina, tin oxides, and/or mixed metal oxide nanoparticles can be present in the brightness enhancing film in an amount from 10 to 70 wt-%, or 30 to 60 wt-%. Mixed metal oxide for use in materials of the invention are commercially available from Catalysts & Chemical Industries Corp., Kawasaki, Japan, under the trade designation "Optolake 3".

Surface-treating the nano-sized particles can provide a stable dispersion in the polymeric resin. Preferably, the surface-treatment stabilizes the nanoparticles so that the particles will be well dispersed in the polymerizable resin and result in a substantially homogeneous composition. Furthermore, the nanoparticles can be modified over at least a portion of its surface with a surface treatment agent so that the stabilized particle can copolymerize or react with the polymerizable resin during curing.

The nanoparticles are preferably treated with a surface treatment agent. In general, a surface treatment agent has a first end that will attach to the particle surface (covalently, ionically or through strong physisorption) and a second end that imparts compatibility of the particle with the resin and/or reacts with resin during curing. Examples of surface treatment agents include alcohols, amines, carboxylic acids, sulfonic acids, phosphonic acids, silanes and titanates. The preferred type of treatment agent is determined, in part, by the chemical nature of the metal oxide surface. Silanes are preferred for silica and other for siliceous fillers. Silanes and carboxylic acids are preferred for metal oxides such as zirconia. The surface modification can be done either subsequent to mixing with the monomers or after mixing. It is preferred in the case of silanes to react the silanes with the particle or nanoparticle surface before incorporation into the resin. The required amount of surface modifier is dependant upon several factors such particle size, particle type, molecular weight of the modifier, and modifier type. In general it is preferred that approximately a monolayer of modifier is attached to the surface of the particle. The attachment procedure or reaction conditions required also depend on the surface modifier used. For silanes it is preferred to surface treat at elevated temperatures under acidic or basic conditions for from 1-24 hr approximately. Surface treatment agents such as carboxylic acids do not require elevated temperatures or extended time.

Representative embodiments of surface treatment agents include compounds such as, for example, isooctyl trimethoxy-silane, N-(3-triethoxysilylpropyl)methoxyethoxyethoxyethyl carbamate (PEG3TES), N-(3-triethoxysilylpropyl)methoxyethoxyethoxyethyl carbamate (PEG2TES), 3-(methacryloyloxy)propyltrimethoxysilane, 3-acryloxypropyltrimethoxysilane, 3-(methacryloyloxy)propyltriethoxysilane, 3-(methacryloyloxy)propylmethyldimethoxysilane, 3-(acryloyloxypropyl)methyldimethoxysilane, 3-(methacryloyloxy)propyldimethylethoxysilane, 3-(methacryloyloxy)propyldimethylethoxysilane, vinyldimethylethoxysilane, phenyltrimethoxysilane, n-octyltrimethoxysilane, dodecyltrimethoxysilane, octadecyltrimethoxysilane, propyltrimethoxysilane, hexyltrimethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltris-isobutoxysilane, vinyltriisopropenoxysilane, vinyltris(2-methoxyethoxy)silane, styrylethyltrimethoxysilane, mercaptopropyltrimethoxysilane, 3-glycidoxypropyltrimethoxysilane, acrylic acid, methacrylic acid, oleic acid, stearic acid, dodecanoic acid, 2-[2-(2-methoxyethoxy)ethoxy]acetic acid (MEEAA), beta-carboxyethylacrylate, 2-(2-methoxyethoxy)acetic acid, methoxyphenyl acetic acid, and mixtures thereof. Further, a proprietary silane surface modifier, commercially available from OSI Specialties, Crompton South Charleston, W.V. under the trade designation "Silquest A1230", has been found particularly suitable.

The surface modification of the particles in the colloidal dispersion can be accomplished in a variety of ways. The process involves the mixture of an inorganic dispersion with surface modifying agents. Optionally, a co-solvent can be added at this point, such as for example, 1-methoxy-2-propanol, ethanol, isopropanol, ethylene glycol, N,N-dimethylacetamide and 1-methyl-2-pyrrolidinone. The co-solvent can enhance the solubility of the surface modifying agents as well as the surface modified particles. The mixture comprising the inorganic sol and surface modifying agents is subsequently reacted at room or an elevated temperature, with or without mixing. In one method, the mixture can be reacted at about 85 degree C. for about 24 hours, resulting in the surface modified sol. In another method, where metal oxides are surface modified the surface treatment of the metal oxide can preferably involve the adsorption of acidic molecules to the particle surface. The surface modification of the heavy metal oxide preferably takes place at room temperature.

The surface modification of $ZrO_2$ with silanes can be accomplished under acidic conditions or basic conditions. In one case the silanes are heated under acid conditions for a suitable period of time. At which time the dispersion is combined with aqueous ammonia (or other base). This method allows removal of the acid counter ion from the $ZrO_2$ surface as well as reaction with the silane. In a one method the particles are precipitated from the dispersion and separated from the liquid phase.

A combination of surface modifying agents can be useful, wherein at least one of the agents has a functional group co-polymerizable with a hardenable resin. For example, the polymerizing group can be ethylenically unsaturated or a cyclic function subject to ring opening polymerization. An ethylenically unsaturated polymerizing group can be, for example, an acrylate or methacrylate, or vinyl group. A cyclic functional group subject to ring opening polymerization generally contains a heteroatom such as oxygen, sulfur or nitrogen, and preferably a 3-membered ring containing oxygen such as an epoxide.

The surface modified particles can then be incorporated into the curable resin in various methods. In a preferred aspect, a solvent exchange procedure is utilized whereby the resin is added to the surface modified sol, followed by removal of the water and co-solvent (if used) via evaporation, thus leaving the particles dispersed in the polyerizable resin. The evaporation step can be accomplished for example, via distillation, rotary evaporation or oven drying.

In another aspect, the surface modified particles can be extracted into a water immiscible solvent followed by solvent exchange, if so desired.

Alternatively, another method for incorporating the surface modified nanoparticles in the polymerizable resin involves the drying of the modified particles into a powder, followed by the addition of the resin material into which the particles are dispersed. The drying step in this method can be accomplished by conventional means suitable for the system, such as, for example, oven drying or spray drying.

The polymerizable compositions described herein can also contain one or more other useful additive as known in art including but not limited to surfactants, pigments, fillers, polymerization inhibitors, antioxidants, anti-static agents, and other possible ingredients.

Suitable methods of polymerization include solution polymerization, suspension polymerization, emulsion polymerization, and bulk polymerization, as are known in the art. Suitable methods include heating in the presence of a free-radical initiator as well as irradiation with electromagnetic radiation such as ultraviolet or visible light in the presence of a photoinitiator. Inhibitors are frequently used in the synthesis of the polymerizable composition to prevent premature polymerization of the resin during synthesis, transportation and storage. Suitable inhibitors include hydroquinone, 4-methoxy phenol, and hindered amine nitroxide inhibitors at levels of 50-1000 ppm. Other kinds and/or amounts of inhibitors may be employed as known to those skilled in the art.

The radiation (e.g. UV) curable compositions comprise a least one photoinitiator. A single photoinitiator or blends thereof may be employed in the brightness enhancement film of the invention. In general the photoinitiator(s) are at least partially soluble (e.g. at the processing temperature of the resin) and substantially colorless after being polymerized. The photoinitiator may be (e.g. yellow) colored, provided that the photoinitiator is rendered substantially colorless after exposure to the UV light source.

Suitable photoinitiators include monoacylphosphine oxide and bisacylphosphine oxide. Commercially available mono or bisacylphosphine oxide photoinitiators include 2,4,6-trimethylbenzoydiphenylphosphine oxide, commercially available from BASF (Charlotte, N.C.) under the trade designation "Lucirin TPO"; ethyl-2,4,6-trimethylbenzoylphenyl phosphinate, also commercially available from BASF under the trade designation "Lucirin TPO-L"; and bis (2,4,6-trimethylbenzoyl)-phenylphosphine oxide commercially available from Ciba Specialty Chemicals under the trade designation "Irgacure 819". Other suitable photoinitiators include 2-hydroxy-2-methyl-1-phenyl-propan-1-one, commercially available from Ciba Specialty Chemicals under the trade designation "Darocur 1173" as well as other photoinitiators commercially available from Ciba Specialty Chemicals under the trade designations "Darocur 4265", "Irgacure 651", "Irgacure 1800", "Irgacure 369", "Irgacure 1700", and "Irgacure 907".

The photoinitiator can be used at a concentration of about 0.1 to about 10 weight percent. More preferably, the photoinitiator is used at a concentration of about 0.5 to about 5 wt-%. Greater than 5 wt-% is generally disadvantageous in view of the tendency to cause yellow discoloration of the brightness enhancing film. Other photoinitiators and photoinitiator may also suitably be employed as may be determined by one of ordinary skill in the art.

Surfactants such as fluorosurfactants and silicone based surfactants can optionally be included in the polymerizable composition to reduce surface tension, improve wetting, allow smoother coating and fewer defects of the coating, etc.

The optical layer can directly contact the base layer or be optically aligned to the base layer, and can be of a size, shape and thickness allowing the optical layer to direct or concentrate the flow of light. The optical layer can have a structured or micro-structured surface that can have any of a number of useful patterns such as described and shown in the FIGURES. The micro-structured surface can be a plurality of parallel longitudinal ridges extending along a length or width of the film. These ridges can be formed from a plurality of prism apexes. These apexes can be sharp, rounded or flattened or truncated. For example, the ridges can be rounded to a radius in a range of 4 to 7 micrometers.

These include regular or irregular prismatic patterns can be an annular prismatic pattern, a cube-corner pattern or any other lenticular microstructure. A useful microstructure is a regular prismatic pattern that can act as a totally internal reflecting film for use as a brightness enhancement film. Another useful microstructure is a corner-cube prismatic pattern that can act as a retro-reflecting film or element for use as reflecting film. Another useful microstructure is a prismatic pattern that can act as an optical element for use in an optical display. Another useful microstructure is a prismatic pattern that can act as an optical turning film or element for use in an optical display.

The base layer can be of a nature and composition suitable for use in an optical product, i.e. a product designed to control the flow of light. Almost any material can be used as a base material as long as the material is sufficiently optically clear and is structurally strong enough to be assembled into or used within a particular optical product. A base material can be chosen that has sufficient resistance to temperature and aging that performance of the optical product is not compromised over time.

The particular chemical composition and thickness of the base material for any optical product can depend on the requirements of the particular optical product that is being constructed. That is, balancing the needs for strength, clarity, temperature resistance, surface energy, adherence to the optical layer, among others.

Useful base materials include, for example, styrene-acrylonitrile, cellulose acetate butyrate, cellulose acetate propionate, cellulose triacetate, polyether sulfone, polymethyl methacrylate, polyurethane, polyester, polycarbonate, polyvinyl chloride, polystyrene, polyethylene naphthalate, copolymers or blends based on naphthalene dicarboxylic acids, polycyclo-olefins, polyimides, and glass. Optionally, the base material can contain mixtures or combinations of these materials. In an embodiment, the base may be multi-layered or may contain a dispersed phase suspended or dispersed in a continuous phase.

For some optical products such as microstructure-bearing products such as, for example, brightness enhancement films, examples of preferred base materials include polyethylene terephthalate (PET) and polycarbonate. Examples of useful PET films include photograde polyethylene terephthalate and MELINEX™ PET available from DuPont Films of Wilmington, Del.

Some base materials can be optically active, and can act as polarizing materials. A number of bases, also referred to herein as films or substrates, are known in the optical product art to be useful as polarizing materials. Polarization of light through a film can be accomplished, for example, by the inclusion of dichroic polarizers in a film material that selectively absorbs passing light. Light polarization can also be achieved by including inorganic materials such as aligned mica chips or by a discontinuous phase dispersed within a continuous film, such as droplets of light modulating liquid crystals dispersed within a continuous film. As an alternative, a film can be prepared from microfine layers of different materials. The polarizing materials within the film can be aligned into a polarizing orientation, for example, by employing methods such as stretching the film, applying electric or magnetic fields, and coating techniques.

Examples of polarizing films include those described in U.S. Pat. Nos. 5,825,543 and 5,783,120, each of which are incorporated herein by reference. The use of these polarizer films in combination with a brightness enhancement film has been described in U.S. Pat. No. 6,111,696, incorporated by reference herein.

A second example of a polarizing film that can be used as a base are those films described in U.S. Pat. No. 5,882,774, also incorporated herein by reference. Films available commercially are the multilayer films sold under the trade designation DBEF (Dual Brightness Enhancement Film) from 3M. The use of such multilayer polarizing optical film in a brightness enhancement film has been described in U.S. Pat. No. 5,828,488, incorporated herein by reference.

This list of base materials is not exclusive, and as will be appreciated by those of skill in the art, other polarizing and non-polarizing films can also be useful as the base for the optical products of the invention. These base materials can be combined with any number of other films including, for example, polarizing films to form multilayer structures. A short list of additional base materials can include those films described in U.S. Pat. Nos. 5,612,820 and 5,486,949, among others. The thickness of a particular base can also depend on the above-described requirements of the optical product.

Microstructure-bearing articles can be constructed in a variety of forms, including those having a series of alternating tips and grooves sufficient to produce a totally internal reflecting film. An example of such a film is a brightness enhancing film having a regular repeating pattern of symmetrical tips and grooves, while other examples have patterns in which the tips and grooves are not symmetrical. Examples of microstructure bearing articles useful as brightness enhancing films are described by U.S. Pat. Nos. 5,175,030 and 5,183,597, which are both incorporated herein by reference.

According to these patents, a microstructure-bearing article can be prepared by a method including the steps of (a) preparing a polymerizable composition; (b) depositing the polymerizable composition onto a master negative microstructured molding surface in an amount barely sufficient to fill the cavities of the master; (c) filling the cavities by moving a bead of the polymerizable composition between a preformed base and the master, at least one of which is flexible; and (d) curing the composition. The master can be metallic, such as nickel, nickel-plated copper or brass, or can be a thermoplastic material that is stable under polymerization conditions and that preferably has a surface energy that permits clean removal of the polymerized material from the master. One or more the surfaces of the base film can be optionally be primed or otherwise be treated to promote adhesion of the optical layer to the base.

The particular method used to create the microstructure topography described herein can be similar to the molding process described in U.S. Pat. No. 5,691,846 which is incorporated by reference herein. The microstructure article according to the invention can be formed from a continuous process at any desired length such as, for example, 5, 10, 100, 1000 meters or more.

The structure of the brightness enhancing films can include a wide variety of micro-structured films such as, for example, U.S. Pat. No. 5,771,328, U.S. Pat. No. 5,917,664, U.S. Pat. No. 5,919,551, U.S. Pat. No. 6,280,063, and U.S. Pat. No. 6,356,391, all incorporated by reference herein.

A backlit liquid crystal display generally indicated at 10 in FIG. 1 includes a brightness enhancement film 11 of the present invention that can be positioned between a diffuser 12 and a liquid crystal display panel 14. The backlit liquid crystal display can also includes a light source 16 such as a fluorescent lamp, a light guide 18 for transporting light for reflection toward the liquid crystal display panel 14, and a white reflector 20 for reflecting light also toward the liquid crystal display panel. The brightness enhancement film 11 collimates light emitted from the light guide 18 thereby increasing the brightness of the liquid crystal display panel 14. The increased brightness enables a sharper image to be produced by the liquid crystal display panel and allows the power of the light source 16 to be reduced to produce a selected brightness. The brightness enhancement film 11 in the backlit liquid crystal display is useful in equipment such as computer displays (laptop displays and computer monitors), televisions, video recorders, mobile communication devices, handheld devices (i.e. cellphone, PDA), automobile and avionic instrument displays, and the like, represented by reference character 21.

Figure 2:
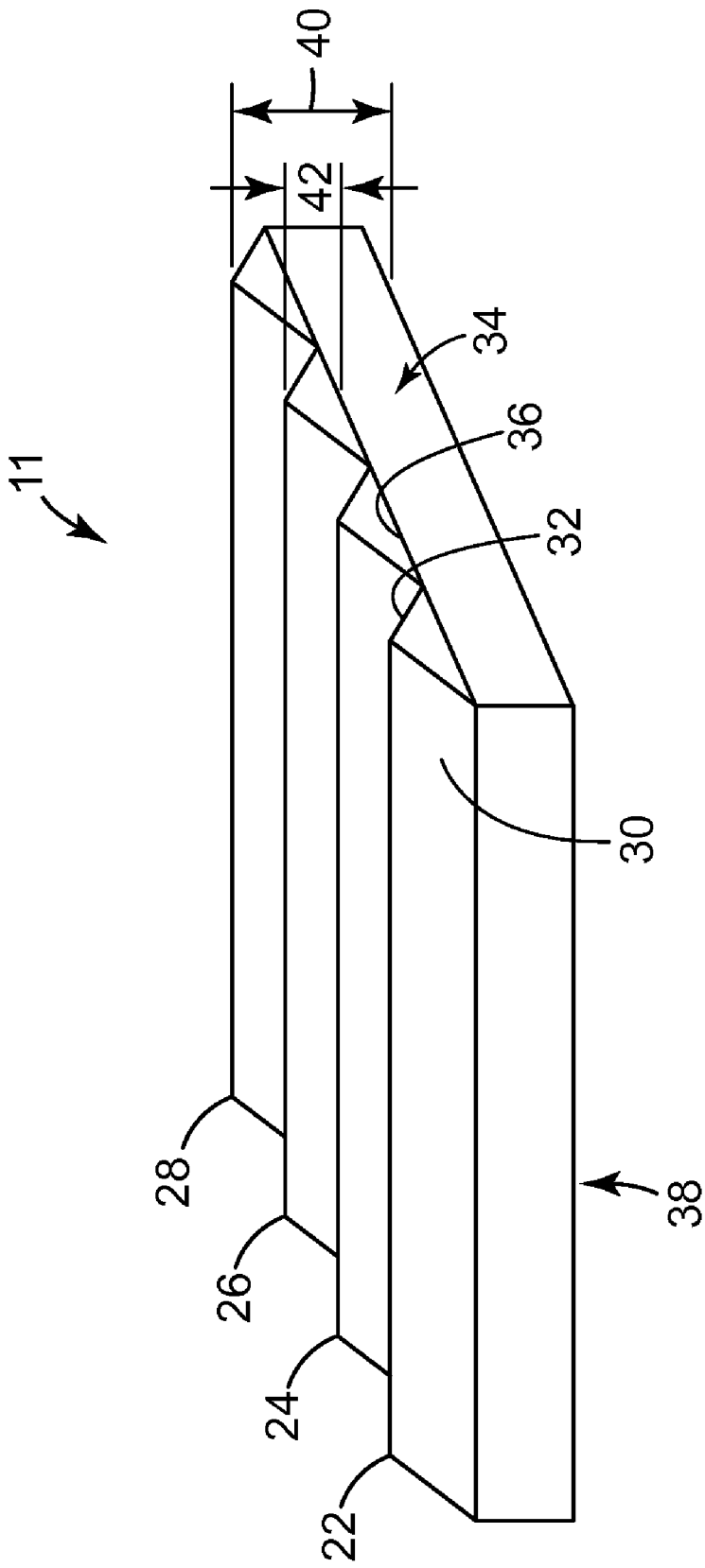
FIG. 2 is a perspective view of an illustrative polymerized structure bearing a micro-structured surface.

The brightness enhancement film 11 includes an array of prisms typified by prisms 22, 24, 26, and 28, as illustrated in FIG. 2. Each prism, for example, such as prism 22, has a first facet 30 and a second facet 32. The prisms 22, 24, 26, and 28 can be formed on a body portion 34 that has a first surface 36 on which the prisms are formed and a second surface 38 that is substantially flat or planar and opposite the first surface.

A linear array of regular right prisms can provide both optical performance and ease of manufacture. By right prisms, it is meant that the apex angle $\theta$ is approximately 90°, but can also range from approximately 70° to 120° or from approximately 80° to 100°. The prism facets need not be identical, and the prisms may be tilted with respect to each other. Furthermore, the relationship between the thickness 40 of the film and the height 42 of the prisms is not critical, but it is desirable to use thinner films with well defined prism facets. The angle that the facets can form with the surface 38 if the facets were to be projected can be 450. However, this angle would vary depending on the pitch of the facet or the angle θ of the apex.

FIGS. 3-9 illustrate representative embodiments of a construction for an optical element. It should be noted that these drawings are not to scale and that, in particular, the size of the structured surface is greatly exaggerated for illustrative purposes. The construction of the optical element can include combinations or two or more of the described embodiments below.

Figure 3:
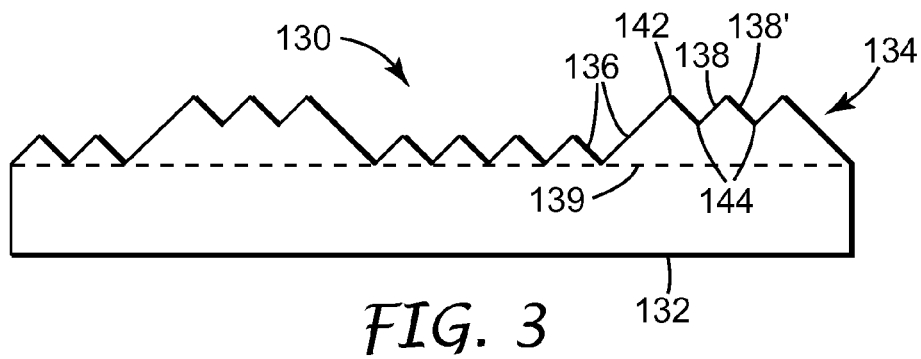
FIG. 3 is a cross-sectional view of an illustrative microstructured article that has prism elements of varying height.

Referring to FIG. 3, there is illustrated a representative cross-section of a portion of one embodiment of an optical element or light directing film. The film 130 includes a first surface 132 and an opposing structured surface 134 which includes a plurality of substantially linearly extending prism elements 136. Each prism element 136 has a first side surface 138 and a second side surface 138', the top edges of which intersect to define the peak, or apex 142 of the prism element 136. The bottom edges of side surfaces 138, 138' of adjacent prism elements 136 intersect to form a linearly extending groove 144 between prism elements. In the embodiment illustrated in FIG. 3, the dihedral angle defined by the prism apex 142 measures approximately 90 degrees, however it will be appreciated that the exact measure of the dihedral angle in this and other embodiments may be varied in accordance with desired optical parameters.

The structured surface 134 of film 130 may be described as having a plurality of alternating zones of prism elements having peaks which are spaced at different distances from a common reference plane. The common reference plane may be arbitrarily selected. One convenient example of a common reference plane is the plane which contains first surface 132; another is the plane defined by the bottom of the lower most grooves of the structured surface, indicated by dashed line 139. In the embodiment illustrated in FIG. 3, the shorter prism elements measure approximately 50 microns in width and approximately 25 microns in height, measured from dashed line 139, while the taller prism elements measure approximately 50 microns in width and approximately 26 microns in height. The width of the zone which includes the taller prism elements can measure between about 1 micron and 300 microns. The width of the zone that includes the shorter prism elements is not critical and can measures between 200 microns and 4000 microns. In any given embodiment the zone of shorter prism elements can be at least as wide as the zone of taller prism elements. It will be appreciated by one of ordinary skill in the art that the article depicted in FIG. 3 is merely exemplary and is not intended to limit the scope of the present invention. For example, the height or width of the prism elements may be changed within practicable limits—it is practicable to machine precise prisms in ranges extending from about 1 micron to about 200 microns. Additionally, the dihedral angles may be changed or the prism axis may be tilted to achieve a desired optical effect.

The width of the first zone can be less than about 200 to 300 microns. Under normal viewing conditions, the human eye has difficulty resolving small variations in the intensity of light that occur in regions less than about 200 to 300 microns in width. Thus, when the width of the first zone is reduced to less than about 200 to 300 microns, any optical coupling that may occur in this zone is not detectable to the human eye under normal viewing conditions.

A variable height structured surface may also be implemented by varying the height of one or more prism elements along its linear extent to create alternating zones which include portions of prism elements having peaks disposed at varying heights above a common reference plane.

Figure 4:
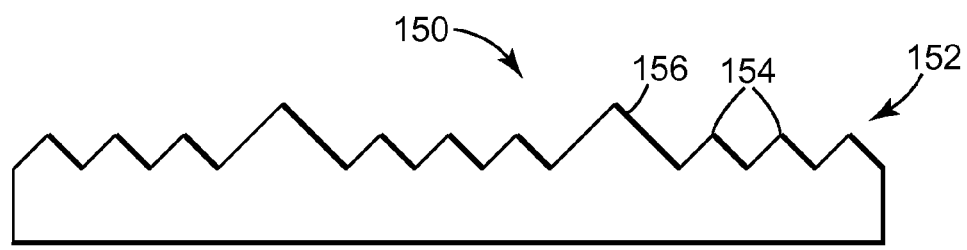
FIG. 4 is a cross-sectional view of an illustrative microstructured article that has prism elements of varying height.

FIG. 4 illustrates another embodiment of the optical element similar to FIG. 3 except that the film 150 includes a structured surface 152 which has a zone of relatively shorter prism elements 154 separated by a zone including a single taller prism element 156. Much like the embodiment depicted in FIG. 3, the taller prism element limits the physical proximity of a second sheet of film to structured surface 152, thereby reducing the likelihood of a visible wet-out condition. It has been determined that the human eye is sensitive to changes in facet heights in light directing films and that relatively wide zones of taller prism elements will appear as visible lines on the surface of a film. While this does not materially affect the optical performance of the film, the lines may be undesirable in certain commercial circumstances. Reducing the width of a zone of taller prism elements correspondingly reduces the ability of a human eye to detect the lines in the film caused by the taller prism elements.

Figure 5:
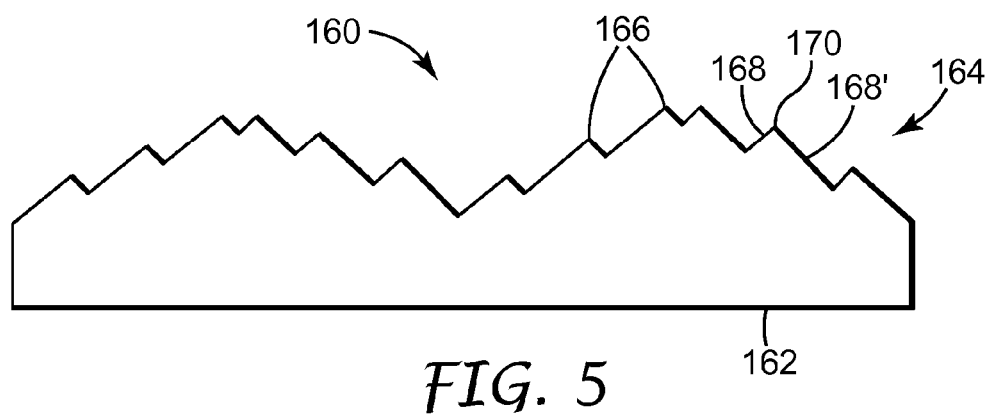
FIG. 5 is a cross-sectional view of an illustrative microstructured article.

FIG. 5 is a representative example of another embodiment of an optical element in which the prism elements are approximately the same size but are arranged in a repeating stair step or ramp pattern. The film 160 depicted in FIG. 5 includes a first surface 162 and an opposing structured surface 164 including a plurality of substantially linear prism elements 166. Each prism element has opposing lateral faces 168, 168' which intersect at their upper edge to define the prism peaks 170. The dihedral angle defined by opposing lateral faces 168, 168' measures approximately 90 degrees. In this embodiment the highest prisms may be considered a first zone and adjacent prisms may be considered a second zone. Again, the first zone can measure less than about 200 to 300 microns.

Figure 6:
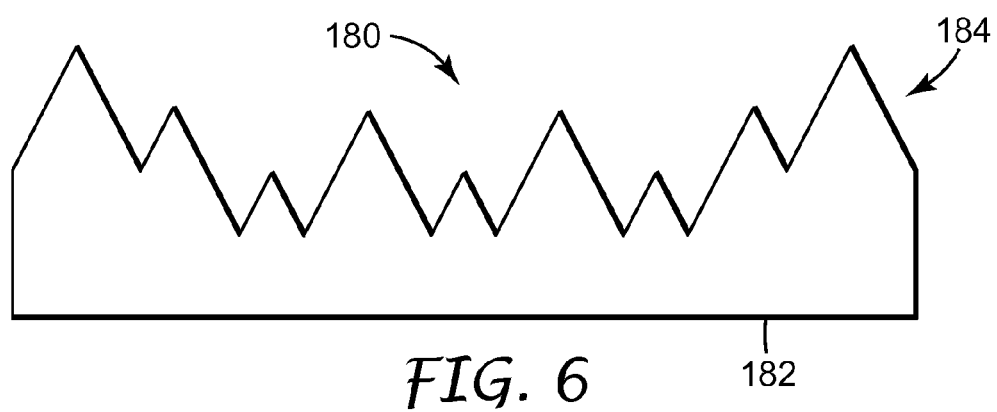
FIG. 6 is a cross-sectional view of an illustrative microstructured article in which the prism elements are of different heights and have their bases in different planes.

FIG. 6 illustrates a further embodiment of an optical element. The film 180 disclosed in FIG. 6 includes a first surface 182 and an opposing structured surface 184. This film may be characterized in that the second zone which includes relatively shorter prism elements contains prism elements of varying height. The structured surface depicted in FIG. 6 has the additional advantage of substantially reducing the visibility to the human eye of lines on the surface of the film caused by the variations in the height of the prism elements.

Figure 7:
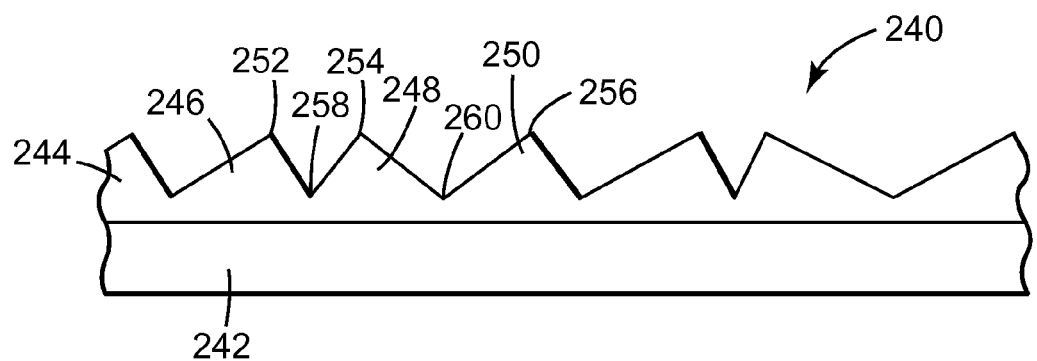
FIG. 7 is a cross-sectional view of an illustrative microstructured article.

FIG. 7 shows another embodiment of an optical element for providing a soft cutoff. FIG. 7 shows a brightness enhancement film, designated generally as 240, according to the invention. Brightness enhancement film 240 includes a substrate 242 and a structured surface material 244. Substrate 242 is can generally be a polyester material and structured surface material 244 can be an ultraviolet-cured acrylic or other polymeric material discussed herein. The exterior surface of substrate 242 is preferably flat, but could have structures as well. Furthermore, other alternative substrates could be used.

Structured surface material 244 has a plurality of prisms such as prisms 246, 248, and 250, formed thereon. Prisms 246, 248, and 250 have peaks 252, 254, and 256, respectively. All of peaks 252, 254, and 256 have peak or prism angles of preferably 90 degrees, although included angles in the range 60 degrees to 120 degrees. Between prisms 246 and 248 is a valley 258. Between prisms 248 and 250 is a valley 260. Valley 258 may be considered to have the valley associated with prism 246 and has a valley angle of 70 degrees and valley 260 may be considered the valley associated with prism 248 and has a valley angle of 110 degrees, although other values could be used. Effectively, brightness enhancement film 240 increases the apparent on axis brightness of a backlight by reflecting and recycling some of the light and refracting the remainder like prior art brightness enhancement film, but with the prisms canted in alternating directions. The effect of canting the prisms is to increase the size of the output light cone.

Figure 8:
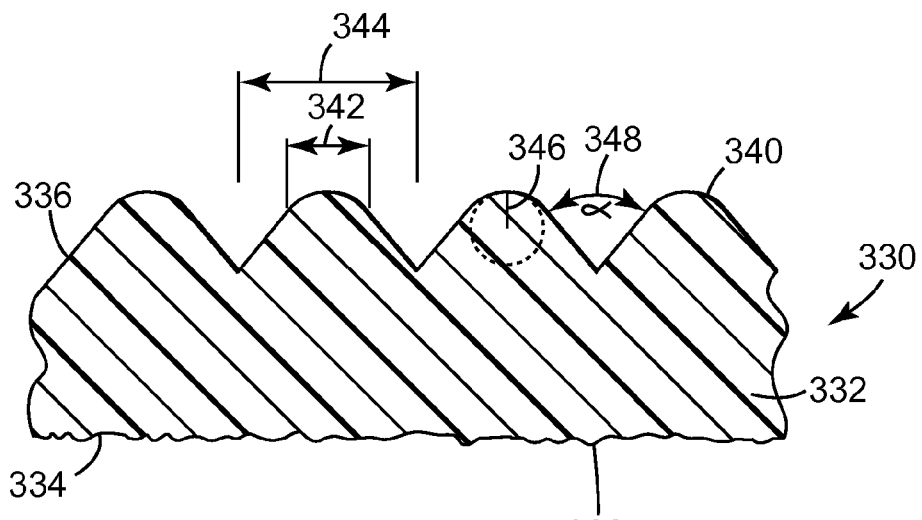
FIG. 8 is a cross-sectional view of an illustrative microstructured article.

FIG. 8 shows another embodiment of an optical element having rounded prism apexes. The brightness enhancement article 330 features a flexible, base layer 332 having a pair of opposed surfaces 334, 336, both of which are integrally formed with base layer 332. Surface 334 features a series of protruding light-diffusing elements 338. These elements may be in the form of "bumps" in the surface made of the same material as layer 332. Surface 336 features an array of linear prisms having blunted or rounded peaks 340 integrally formed with base layer 332. These peaks are characterized by a chord width 342, cross-sectional pitch width 344, radius of curvature 346, and root angle 348 in which the chord width is equal to about 20-40% of the cross-sectional pitch width and the radius of curvature is equal to about 20-50% of the cross-sectional pitch width. The root angle ranges from about 70-110 degrees, or from about 85-95 degrees, with root angles of about 90 degrees being preferred. The placement of the prisms within the array is selected to maximize the desired optical performance.

Rounded prism apex brightness enhancement articles usually suffer from decreased gain. However, the addition of high refractive index surface modified colloidal nanoparticles can offset the lost gain from the rounded prism apex brightness enhancement articles.

Figure 9:
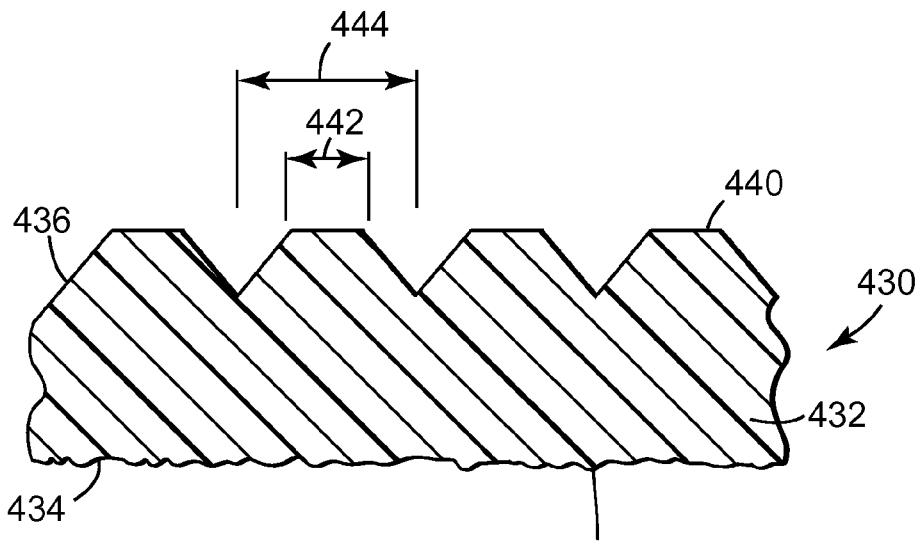
FIG. 9 is a cross-sectional view of an illustrative microstructured article.

FIG. 9 shows another embodiment of an optical element having flat or planar prism apexes. The brightness enhancement article 430 features a flexible, base layer 432 having a pair of opposed surfaces 434, 436, both of which are integrally formed with base layer 432. Surface 434 features a series of protruding light-diffusing elements 438. These elements may be in the form of "flat bumps" in the surface made of the same material as layer 432. Surface 436 features an array of linear prisms having flattened or planar peaks 440 integrally formed with base layer 432. These peaks are characterized by a flattened width 442 and cross-sectional pitch width 444, in which the flattened width can be equal to about 0-30% of the cross-sectional pitch width.

Another method of extracting light from a lightguide is by use of frustrated total internal reflection (TIR). In one type of frustrated TIR the lightguide has a wedge shape, and light rays incident on a thick edge of the lightguide are totally internally reflected until achieving critical angle relative to the top and bottom surfaces of the lightguide. These sub-critical angle light rays are then extracted, or more succinctly refract from the lightguide, at a glancing angle to the output surface. To be useful for illuminating a display device, these light rays must then be turned substantially parallel to a viewing, or output, axis of the display device. This turning is usually accomplished using a turning lens or turning film.

Figure 10:
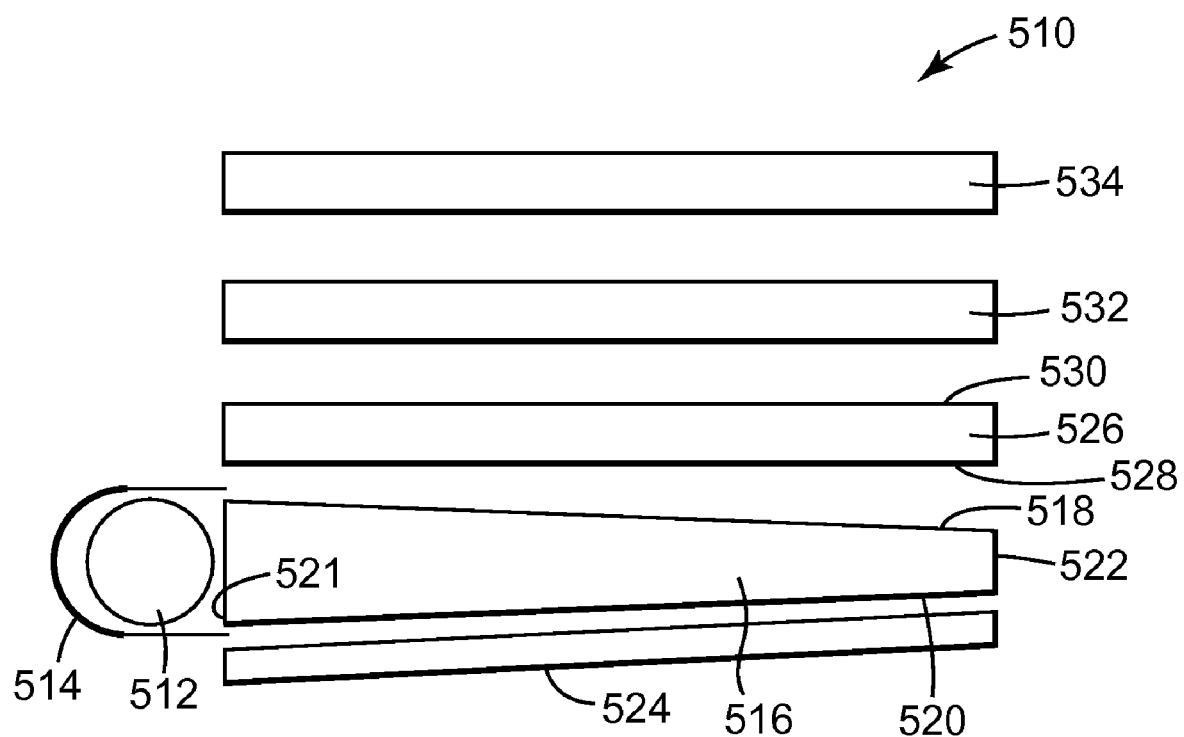
FIG. 10 is a schematic view of an illumination device including a turning film.
Figure 11:
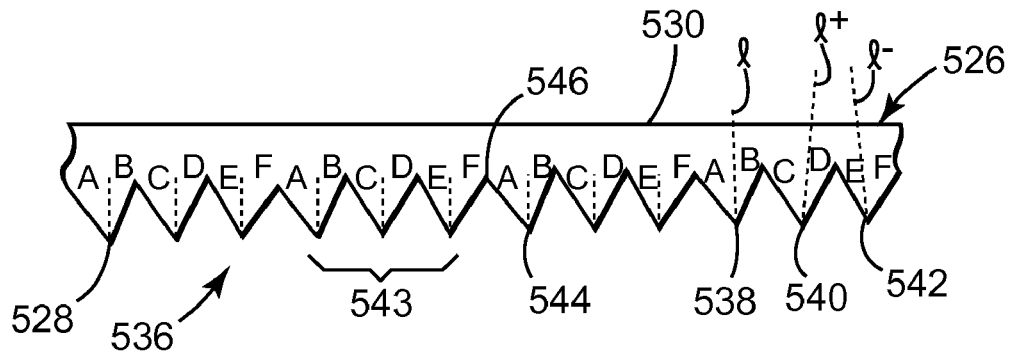
FIG. 11 is a cross-sectional view of a turning film.
Figure 12:
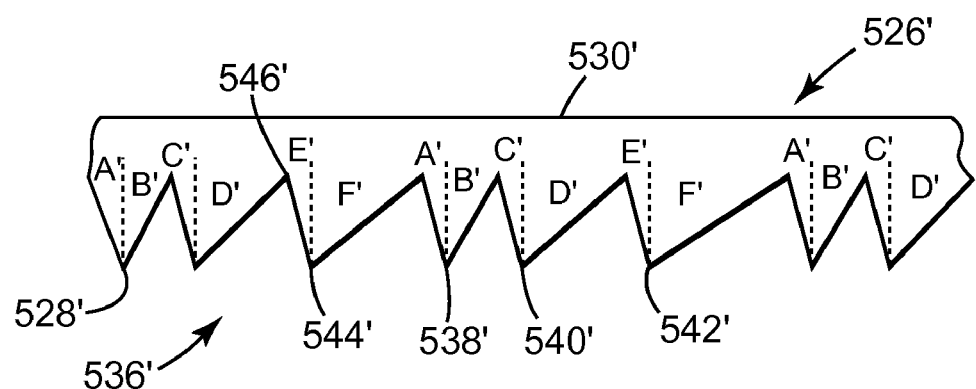
FIG. 12 is a cross-sectional view of another turning film.

FIGS. 10-12 illustrate an illumination device including a turning film. The turning film can include the inventive materials disclosed herein. A turning lens or turning film typically includes prism structures formed on an input surface, and the input surface is disposed adjacent the lightguide. The light rays exiting the lightguide at the glancing angle, usually less than 30 degrees to the output surface, encounter the prism structures. The light rays are refracted by a first surface of the prism structures and are reflected by a second surface of the prism structures such that they are directed by the turning lens or film in the desired direction, e.g., substantially parallel to a viewing axis of the display.

Referring to FIG. 10, an illumination system 510 includes optically coupled a light source 512; a light source reflector 514; a lightguide 516 with an output surface 518, a back surface 520, an input surface 521 and an end surface 522; a reflector 524 adjacent the back surface 520; a first light redirecting element 526 with an input surface 528 and an output surface 530; a second light redirecting element 532; and a reflective polarizer 534. The lightguide 516 may be a wedge or a modification thereof. As is well known, the purpose of the lightguide is to provide for the uniform distribution of light from the light source 512 over an area much larger than the light source 512, and more particularly, substantially over an entire area formed by output surface 518. The lightguide 516 further preferably accomplishes these tasks in a compact, thin package.

The light source 512 may be a CCFL that is edge coupled to the input surface 521 of the lightguide 516, and the lamp reflector 514 may be a reflective film that wraps around the light source 512 forming a lamp cavity. The reflector 524 backs the lightguide 516 and may be an efficient back reflector, e.g., a lambertian or a specular film or a combination.

The edge-coupled light propagates from the input surface 521 toward the end surface 522, confined by TIR. The light is extracted from the lightguide 516 by frustration of the TIR. A ray confined within the lightguide 516 increases its angle of incidence relative to the plane of the top and bottom walls, due to the wedge angle, with each TIR bounce. Thus, the light eventually refracts out of each of the output surface 518 and the back surface 520 because it is no longer contained by TIR. The light refracting out of the back surface 520 is either specularly or diffusely reflected by the reflector 524 back toward and largely through the lightguide 516. The first light redirecting element 526 is arranged to redirect the light rays exiting the output surface 518 along a direction substantially parallel to a preferred viewing direction. The preferred viewing direction may be normal to the output surface 518, but will more typically be at some angle to the output surface 518.

As shown in FIG. 11, the first light redirecting element 526 is a light transmissive optical film where the output surface 530 is substantially planar and the input surface 528 is formed with an array 536 of prisms 538, 540 and 542. The second light redirecting element 532 may also be a light transmissive film, for example a brightness enhancing film such as the 3M Brightness Enhancement Film product (sold as BEFIII) available from 3M Company, St. Paul, Minn. The reflective polarizer 534 may be an inorganic, polymeric, cholesteric liquid crystal reflective polarizer or film. A suitable film is the 3M Diffuse Reflective Polarizer film product (sold as DRPF) or the Specular Reflective Polarizer film product (sold as DBEF), both of which are available from 3M Company.

Within array 536, each prism 538, 540 and 542 may be formed with differing side angles as compared to its respective neighbor prisms. That is, prism 540 may be formed with different side angles (angles C and D) than prism 538 (angles A and B), and prism 542 (angles E and F). As shown, prisms 538 have a prism angle, i.e., the included angle, equal to the sum of the angles A and B. Similarly, prisms 540 have a prism angle equal to the sum of the angles C and D, while prisms 542 have a prism angle equal to the sum of the angles E and F. While array 536 is shown to include three different prism structures based upon different prism angle, it should be appreciated that virtually any number of different prisms may be used.

Prisms 538, 540 and 542 may also be formed with a common prism angle but with a varied prism orientation. A prism axis "l" is illustrated in FIG. 11 for prism 538. The prism axis e may be arranged normal to the output surface 530, as shown for prism 538, or at an angle to the output surface either toward or away from the light source as illustrated by phantom axes "l$^+$" and "l$^-$", respectively, for prisms 540 and 542.

Prisms 538, 540 and 542 may be arranged within array 536 as shown in FIG. 11 in a regular repeating pattern or clusters 543 of prisms, and while the array 536 is not shown to have like prisms adjacent like prisms, such a configuration may also be used. Moreover, within the array 536, the prisms 538, 540 and 542 may change continuously from a first prism configuration, such as prism configuration 538, to a second prism configuration, such as prism configuration 540, and so on. For example, the prism configuration may change in a gradient manner from the first prism configuration to the second prism configuration. Alternatively, the prisms may change in a step-wise manner, similar to the configuration shown in FIG. 11. Within each cluster 543, the prisms have a prism pitch, which is selected to be smaller than the spatial ripple frequency. Likewise, the clusters may have a regular cluster pitch. The prism array can be symmetrical as shown in FIG. 11 or the prism array can be non-symmetrical.

While the array 536 shown in FIG. 11 has prisms having a symmetric configuration, an array of prisms, such as array 536' shown in FIG. 12 formed in light redirecting element 526', may be used. Referring then to FIG. 12, in the array 536', prisms 538', for example, has angle A' unequal to angle B'. Similarly for prisms 540' and 542', angle C' is unequal to angle A' and angle D', and angle E' is unequal to either of angle A', angle C' or angle F'. The array 536' may be advantageously formed using a single diamond cutting tool of a predetermined angle, and tilting the tool for each cut producing prisms of differing prism angle and symmetry. However, it will be appreciated that with the use of a single cutting tool, the prism angles will be the same, i.e., A+B=C+D=E+F.

It is contemplated that as few as two different prism configurations may be used and arranged in clusters within the array 536, although as many prism sizes as necessary to accomplish a modification of the output profile from the lightguide 516 may be used. One purpose of the prism side angle variation is to spread and add variable amounts of optical power into the first light redirecting element 526. The varying configuration of prisms 538, 540 and 542 serves to provide substantially uniform sampling of the input aperture of the lightguide, which minimizes non-uniformities in the light extracted from the lightguide 516. The net result is an effective minimization of the ripple effect particularly near the entrance end 521 of the lightguide 516.

The present invention should not be considered limited to the particular examples described herein, but rather should be understood to cover all aspects of the invention as fairly set out in the attached claims. Various modifications, equivalent processes, as well as numerous structures to which the present invention can be applicable will be readily apparent to those of skill in the art to which the present invention is directed upon review of the instant specification.

All proportions shown in the examples are percent by weight unless otherwise specified.

EXAMPLES

The invention will be explained concretely with reference to the following examples. Incidentally, those skilled in the art could easily understand that the invention is not limited to these examples.

Production of Microstructured Article

A representative microstructured article is a flexible mold suitable to produce PDP back plates having ribs of a grid-like pattern. Nine flexible molds were produced with different organic phase compositions as described as follows:

First, a rectangular master mold having a grid-like rib pattern corresponding to the grid-like rib pattern of each PDP back plate is prepared. The size of the master mold is 125 mm in length×250 mm in width. Each rib intersection of the master mold has a longitudinal rib and a transverse rib each having an isosceles trapezoidal sectional shape. These longitudinal and transverse ribs are arranged substantially parallel while intersecting one another with predetermined gaps among them. Each rib has a height of 210 μm (for both longitudinal and transverse ribs), a top width of 60 μm, a bottom width of 120 μm, a pitch of the longitudinal ribs (distance between centers of adjacent longitudinal ribs) of 300 μm and a pitch of the transverse ribs of 510 μm.

To form a microstructured layer of the mold, a urethane acrylate oligomer, an acryl monomer and a photo-polymerization initiator, listed below, are blended in different amounts (wt %) tabulated in Table 1 to obtain UV-curable compositions 1 to 9.

Urethane Acrylate Oligomer A:
  aliphatic bi-functional urethane acrylate oligomer (molecular weight: 4,000, product of Daicel-UBC Co.), Tg: 15° C.

Urethane Acrylate Oligomer B:
  aliphatic bi-functional urethane acrylate oligomer (molecular weight: 13,000, product of Daicel-UBC Co.), Tg: −55° C.

Acryl Monomer C:
  isobornyl acrylate monofunctional monomer (molecular weight: 208), Tg: 94° C.

Acryl Monomer D:
  phenoxyethyl acrylate monofunctional monomer (molecular weight: 193), Tg: 10° C.

Acryl Monomer E:
  buthoxyethyl acrylate (molecular weight: 172), Tg: −50° C.

Acryl Monomer F:
  ethylcarbitol acrylate (molecular weight: 188), Tg: −67° C.

Acryl Monomer G:
  2-ethylhexyl-diglycol acrylate (molecular weight: 272), Tg: −65° C.

Acryl Monomer H:
  2-butyl-2-ethyl-1,3-propanediol acrylate (molecular weight: 268), Tg: 108° C. Photo-polymerization initiator:

2-hydroxy-2-methyl-1-phenyl-propane-1-on (product of Chiba Specialty Chemicals Co., product name "Darocure 1173")

Further, to use as a support of the mold, a PET film having a size of 400 mm in length, 300 mm in width and 188 μm in thickness (product of Teijin Co. trade name "HPE18", Tg: about 80° C.) is prepared.

Next, each UV-curable composition is applied in a line form to the upstream end of the master mold so prepared. The PET film described above is then laminated in such a fashion as to cover the surface of the master mold. The longitudinal direction of the PET film is parallel to the longitudinal ribs of the master mold, and the thickness of the UV-curable composition sandwiched between the PET film and the master mold is set to about 250 μm. When the PET film is sufficiently pushed by use of a laminate roll, the UV-curable composition is completely filled into the recesses of the master mold, and entrapment of bubbles is not observed.

The ultraviolet rays having a wavelength of 300 to 400 nm (peak wavelength: 352 nm) are irradiated under this state from a fluorescent lamp, a product of Mitsubishi Denki-Oslam Co., to the UV-curable composition for 60 seconds through the PET film. The irradiation dose of the ultraviolet rays is 200 to 300 mJ/cm$^2$. The UV-curable composition is cured to obtain a microstructured layer. Subsequently, the PET film and the microstructured layer are peeled from the master mold to obtain a flexible mold equipped with a large number of groove portions having a shape and a size corresponding to those of the ribs of the master mold.

Test Methods

The following measurements are made for each of the UV-curable compositions 1 to 9 used in the production process of the flexible mold:
(1) elastic modulus (Pa) under the rubber state;
(2) glass transition temperature (Tg, °C.) of cured resin; and
(3) viscosity (cps, at 22° C.) of the uncured resin.

The result is tabulated in Table 1.

(1) Elastic Modulus Under Rubber State

Each UV-curable composition is cured through the irradiation of the ultraviolet rays in the same way as described above, and a rectangular cured resin film (22.7 mm in length, 10 mm in width and 200 μm in thickness) is prepared. The elastic modulus of this test-piece is measured by use of a dynamic visco-elastometer (model "RSAII", product of Rheometrics Co.).

(2) Glass Transition Temperature of Cured Resin

Each UV-curable composition is cured through the irradiation of the ultraviolet rays in the same way as described above, and a rectangular cured resin film (22.7 mm in length, 10 mm in width and 200 μm in thickness) is prepared. The glass transition temperature (Tg) of this test-piece is measured in accordance with the test method stipulated in JIS K7244-1. The test-piece is fitted to a dynamic visco-elastometer (model "RSAII", product of Rheometrics Co.), and dynamic mechanical properties are measured at a deformation frequency of 1 Hz, a maximum deformation amount of 0.04% and a temperature elevation rate of 5° C./min. The glass transition temperature is calculated from the measurement value so obtained.

(3) Viscosity

Brookfield viscosity is measured at room temperature (22° C.) using a B type viscometer.

Evaluation Test

In the production process of the flexible mold described above, whether or not the mold undergoes peel deformation (deformation of PET film resulting from peeling) when the mold is peeled from the master mold is evaluated. In addition, the relation between the existence/absence of peel deformation and the glass transition temperature (Tg) of each UV-curable composition is examined.

After the microstructured layer is formed by curing the UV-curable composition, the PET film and the microstructured layer integrated with the PET film are subjected to 180° peeling at a tensile speed of about 100 mm/sec in a tensile direction parallel to the longitudinal ribs of the master mold and parallel to the mold surface, and the mold is then removed from the master mold. Next, the longitudinal direction of the PET film is oriented and is brought into contact with the vertical wall surface for the mold immediately after it is peeled from the master mold. While the PET film keeps contact with the wall surface, an upper end side (a part) of the PET film is bonded and fixed to the wall surface by use of an adhesive tape. Warp of the center portion of the PET film is measured while it is unfixed, and when the warp amount is 30 mm or more, the PET film is evaluated as "having peel deformation". When the warp amount is less than 30 mm, the PET film is evaluated as "no peel deformation". The evaluation result so obtained is tabulated in the following Table 1:

TABLE 1

| Component | UV-curable composition | | | | | | | | |
|---|---|---|---|---|---|---|---|---|---|
| | 1 | 2 | 3 | 4 | 5 | 6 | 7 | 8 | 9 |
| urethane acrylate oligomer A | 80 | 40 | 40 | 40 | 40 | | | | |
| urethane acrylate oligomer B | | | | | | 100 | 50 | 50 | 50 |
| acryl monomer C | | 50 | | | | | | | |
| acryl monomer D | 20 | 10 | 60 | 10 | 10 | | | 25 | 50 |
| acryl monomer E | | | | 50 | | | | | |
| acryl monomer F | | | | | 50 | | | | |
| acryl monomer G | | | | | | | 50 | 25 | |
| acryl monomer H | | | | | | | 10 | 10 | 10 |
| photopolymerization initiator | 1 | 1 | 1 | 1 | 1 | 1 | 1.1 | 1.1 | 1.1 |
| Tg (° C.) | 15 | 40 | 10 | −20 | −30 | −55 | −40 | −20 | 10 |
| elastic modulus under rubber state (Pa) | $1 \times 10^7$ | $3 \times 10^6$ | $4 \times 10^6$ | $4 \times 10^6$ | $4 \times 10^6$ | $5 \times 10^6$ | $4 \times 10^6$ | $4 \times 10^6$ | $5 \times 10^6$ |
| peel deformation | yes | yes | yes | no | no | no | no | no | yes |
| viscosity (cps, 22° C.) | 10000 | | | | 50 | 45000 | 300 | | |

The described polymerizable compositions can be prepared into microstructured brightness enhancing film similar to those described in U.S. Pat. Nos. 5,175,030 and 5,183,597 or co-assigned U.S. Patent Application Publication No. 2004/0229059, published Nov. 18, 2004, and U.S. Patent Application Publication No. 2005/0059766-A1, published Mar. 17, 2005, and are incorporated by reference herein.

The described polymerizable compositions (i.e. organic phase) can be combined with the kinds and amounts of inorganic (e.g. surface modified colloidal) nanoparticles as previously described. These compositions, particularly those having a low viscosity (e.g. less than 3000 cps at coating temperature and more preferably less than 1500 cps at coating temperature with the coating temperature ranging from 120° F. to 180° F.) can also be prepared into microstructured brightness enhancing film.

The micro-prismatic structures can have a 90° apex angle as defined by the slope of the sides of the prisms with the mean distance between adjacent apices being about 50 micrometers. The prism vertices or apexes can have a 7 micron radius rounding.

Brightness enhancing films were prepared from polymerizable composition comprising a relatively low Tg organic phase in combination with surface modified inorganic particles as described as follows:

Chemicals Description and Sources
phenolthiazine—Aldrich, Milwaukee, Wis.
BHT (2,6-Di-tert-butyl-4methylphenol )—Aldrich
3-(Trimethoxysilyl)propyl methacrylate—Aldrich
1-methoxy-2-propanol—Aldrich
trimethoxy(2,4,4-trimethylpentyl)silane—Waker Silicones, Adrian, Mich.
collodial silica, commercially available from Nalco, Bedford Park, Ill. under the trade designation "Nalco 2327"
phenoxyethylacrylate, commercially available from Sartomer Co., Exton, Pa. under the trade designation "SR 339" (reported by Sartomer to have a Tg of 5° C.) isobornylacrylate, commercially available from Sartomer Co., Exton, Pa. under the trade designation "SR506" (reported by Sartomer to have a Tg of 88° C.) urethane acrylate (reported by Cognis to have a Tg of 32° C. and elongation of 40%) commercially available from Cognis Corporation under the trade designation "Photomer 6210"
urethane acrylate (reported by Sartomer to have a Tg of –33° C. and elongation of 238%) commercially available from Sartomer Co., Exton, Pa. under the trade designation "33CN966J75"

Preparation of Surface Modified Inorganic Particles

Nalco 2327 (400.25 g @ 40.2% solids) was charged to a 1 qtjar. 1-methoxy-2-propanol (450 g), trimethoxy(2,4,4-trimethylpentyl)silane (4.83 g) and 3-(trimethoxysilyl)propyl methacrylate (19.78 g) were added to the Nalco 2327 with stirring. Approximately 500 ppm phenolthiazine/BHT were added based on 3-(Trimethoxysilyl)propyl methacrylate. The jar was sealed and heated to 80 C. for 15 hr to yield surface modified silica (21.7% solids)

Resin Ex. 10 Silica particles/Photomer 6210/Phenoxyethylacrylate

A 250 ml RB flask was charged with the above prepared silica dispersion (99 g), 1-methoxy-2-propanol (34 g), phenolthiazine (0.02 g) and BHT (0.02 g). The weight reduced to 51 g via rotary evaporation. 1-methoxy-2-propanol (42 g) was charged and the weight reduced to 53.5 g via rotary evaporation. Photomer 6210 (12.51 g) and phenoxyethylacrylate (19.27 g) were added and mixed to obtain a homogeneous solution. The solvent was removed via rotary evaporation. A portion of this (44.9 g) was mixed with photoinitiator (0.25 g TPO-L).

Resin Ex. 11 Silica particles/CN966/Isobornylacrylate

A 500 ml RB flask was charged with the above prepared silica dispersion (100 g), 1-methoxy-2-propanol (10 g), phenolthiazine (0.02 g) and BHT (0.02 g). The weight reduced to 89.37 g via rotary evaporation. CN966J75 (21.6 g) and isobornylacrylate (10.85 g) were added and mixed to obtain a homogeneous solution. The solvent was removed via rotary evaporation. A portion of this (40 g) was mixed with photoinitiator (0.25 g TPO-L).

The resin of Example 10 and 11 were prepared into prismatic microstructured brightness enhancing optical films as follows:

An 8"×11" metal master consisting of linear rows of 90 degree prisms with a nominal pitch spacing of 50 microns, similar to the prism geometry pattern found on Vikuiti BEF II (commercially available from 3M Co., St. Paul, Minn.), was placed on a hot plate and heated to 140° F. A 4 ml bead of the polymerizable resin (as set forth in the Tables) was applied to the master tool using a disposable pipette. Next, a 500 gauge PET available from Dupont Teijn Films as MELINEX 623 was placed on the bead of resin and master tool. The PET film was oriented so the linear prisms are oriented approximately perpendicular (90°±20°) to the high gain axis of the film. The master tool, resin and PET were then passed through a heated nip roll at 160° F. with sufficient force for the resin to fill the master tool completely, while eliminating any entrained air. The filled master tool was then exposed to ultraviolet radiation from a "D-bulb" using a P150 power supply available from Fusion UV Systems, Inc. Gaithersburg, Md. at a linespeed of 50 fpm for two passes. The PET film was then manually removed from the master tool. The prismatic coating formed on the PET film resulted in a coating thickness of approximately 25 microns.

The gain of the resulting films was evaluated as follows:

Gain Test Method

Optical performance of the films was measured using a SpectraScan™ PR-650 SpectraColorimeter with an MS-75 lens, available from Photo Research, Inc, Chatsworth, Calif. The films were placed on top of a diffusely transmissive hollow light box. The diffuse transmission and reflection of the light box can be described as Lambertian. The light box was a six-sided hollow cube measuring approximately 12.5 cm×12.5 cm×11.5 cm (L×W×H) made from diffuse PTFE plates of ~6 mm thickness. One face of the box is chosen as the sample surface. The hollow light box had a diffuse reflectance of ~0.83 measured at the sample surface (e.g. ~83%, averaged over the 400-700 nm wavelength range, measurement method described below). During the gain test, the box is illuminated from within through a ~1 cm circular hole in the bottom of the box (opposite the sample surface, with the light directed towards the sample surface from the inside). This illumination is provided using a stabilized broadband incandescent light source attached to a fiber-optic bundle used to direct the light (Fostec DCR-II with ~1 cm diameter fiber bundle extension from Schott-Fostec LLC, Marlborough Mass. and Auburn, N.Y.). A standard linear absorbing polarizer (such as Melles Griot 03 FPG 007) is placed between the sample box and the camera. The camera is focused on the sample surface of the light box at a distance of ~34 cm and the absorbing polarizer is placed ~2.5 cm from the camera lens. The luminance of the illuminated light box, measured with the polarizer in place and no sample films, was >150 cd/m². The sample luminance is measured with the PR-650 at normal incidence to the plane of the box sample surface when the sample films are placed parallel to the box sample surface, the sample films being in general contact with the box. The relative gain is calculated by comparing this sample luminance to the luminance measured in the same manner from the light box alone. The entire measurement was carried out in a black enclosure to eliminate stray light sources. Relative gain values reported for prismatic films were generally obtained with the prism grooves of the film nearest the absorbing polarizer being aligned parallel to the pass axis of the absorbing polarizer.

The diffuse reflectance of the light box was measured using a 15.25 cm (6 inch) diameter Spectralon-coated integrating sphere, a stabilized broadband halogen light source, and a power supply for the light source all supplied by Labsphere (Sutton, N.H.). The integrating sphere had three opening ports, one port for the input light (of 2.5 cm diameter), one at 90 degrees along a second axis as the detector port (of 2.5 cm diameter), and the third at 90 degrees along a third axis (i.e. orthogonal to the first two axes) as the sample port (of 5 cm diameter). A PR-650 Spectracolorimeter (same as above) was focused on the detector port at a distance of ~38 cm. The reflective efficiency of the integrating sphere was calculated using a calibrated reflectance standard from Labsphere having ~99% diffuse reflectance (SRT-99-050). The standard was calibrated by Labsphere and traceable to a NIST standard (SRS-99-020-REFL-51). The reflective efficiency of the integrating sphere was calculated as follows:

Sphere brightness ratio=1/(1-$R$sphere*$R$standard)

The sphere brightness ratio in this case is the ratio of the luminance measured at the detector port with the reference sample covering the sample port divided by the luminance measured at the detector port with no sample covering the sample port. Knowing this brightness ratio and the reflectance of the calibrated standard (Rstandard), the reflective efficiency of the integrating sphere, Rsphere, can be calculated. This value is then used again in a similar equation to measure a sample's reflectance, in this case the PTFE light box:

Sphere brightness ratio=1/(1-$R$sphere*$R$sample)

Here the sphere brightness ratio is measured as the ratio of the luminance at the detector with the sample at the sample port divided by the luminance measured without the sample. Since Rsphere is known from above, Rsample can be calculated. These reflectances were calculated at 4 nm wavelength intervals and reported as averages over the 400-700 nm wavelength range.

An assembly was prepared wherein each of the prismatic microstructured optical films prepared from the resins of Examples 10 and 11 were stacked with a second piece of the same film. The prismatic microstructured surface of the bottom film was contacted with the base layer substrate of the top film such that the prisms of the bottom film were orthogonal with the prisms of the top film. The gain of this crossed sheet assembly was also measured.

The measured single sheet and crossed sheet gain values are reported as follows:

Polymerized Resin Composition Ex. 10

| Single Sheet | Crossed sheet |
|---|---|
| 1.495 | 1.955 |

Polymerized Resin Composition Ex. 11

| Single Sheet | Crossed sheet |
|---|---|
| 1.492 | 1.992 |

What is claimed is:

1. An article comprising a microstructured surface, wherein the microstructures comprise the reaction product of a polymerizable composition comprising an organic phase comprising at least one oligomer or monomer that comprises at least two (meth)acrylate groups and at least one monofunctional (meth)acryl monomer; wherein said reaction product of the organic phase has a glass transition temperature of less than 35° C.

2. The article of claim 1 article wherein said reaction product has a glass transition temperature of less than 30° C.

3. The article of claim 1 article wherein said reaction product has a glass transition temperature of less than 25° C.

4. The article of claim 1 article wherein said reaction product has a glass transition temperature of less than 20° C.

5. The article of claim 1 article wherein said reaction product has a glass transition temperature of less than 15° C.

6. The article of claim 1 article wherein said reaction product has a glass transition temperature of less than 10° C.

7. The article of claim 1 article wherein said reaction product has a glass transition temperature of less than 5° C.

8. The article of claim 1 wherein the article is a brightness enhancing film or a turning film.

9. The article of claim 8 wherein the microstructures comprises a plurality of ridges.

10. The article of claim 9 wherein the ridges have apexes that are rounded.

11. The article of claim 10 wherein the apexes have a radius ranging from 4 to 15 micrometer.

12. The article of claim 10 wherein the apexes have a radius ranging from 0.5 to 10 micrometers.

13. The article of claim 1 wherein the article is retroreflective sheeting.

14. The article of claim 1 wherein the polymerizable composition comprises at least one urethane (meth)acrylate oligomer.

15. An article comprising a microstructured surface, wherein the microstructures comprise the reaction product of a polymerizable composition comprising at least one oligomer or monomer that comprises at least two (meth) acrylate groups and at least one monofunctional (meth)acryl monomer; wherein said reaction product has a glass transition temperature of less than 0° C.

16. The article of claim 15 wherein the polymerizable composition comprises at least one urethane (meth)acrylate oligomer.

* * * * *

UNITED STATES PATENT AND TRADEMARK OFFICE
CERTIFICATE OF CORRECTION

PATENT NO. : 7,361,409 B2
APPLICATION NO. : 11/276118
DATED : April 22, 2008
INVENTOR(S) : Takaki Sugimoto It is certified that error appears in the above-identified patent and that said Letters Patent is hereby corrected as shown below:

Title page
Column 2 (abstract) line 2 Delete "compris" and insert -- comprises --, therefor.
Column 2 (abstract) line 2 After "of a" delete "of a". (Second Occurrence)

Column 1
Line 52, After "of a" delete "of a". (Second Occurrence)
Line 58, After "of a" delete "of a". (Second Occurrence)

Column 5
Line 17, After "20° C." delete "less". (Second Occurrence)
Line 59, Delete "0C," and insert -- 0° C., --, therefor.

Column 7
Line 64, Delete "Sartommer" and insert -- Sartomer --, therefor.

Column 8
Line 64, Delete "miscroscopy" and insert -- microscopy --, therefor.

Column 9
Line 3, Delete "acssociated." and insert -- associated. --, therefor.

Column 10
Line 3, Delete "phospohonic" and insert -- phosphonic --, therefor.

Column 11
Line 29, Delete "polyerizable" and insert -- polymerizable --, therefor.
Line 61, Delete "a" and insert -- at --, therefor.

Column 15
Line 7, Delete "450." and insert -- 45°. --, therefor.

Column 19
Line 10, Delete "e" and insert -- 1 --, therefor.

UNITED STATES PATENT AND TRADEMARK OFFICE
CERTIFICATE OF CORRECTION

PATENT NO. : 7,361,409 B2
APPLICATION NO. : 11/276118
DATED : April 22, 2008
INVENTOR(S) : Takaki Sugimoto It is certified that error appears in the above-identified patent and that said Letters Patent is hereby corrected as shown below:

Column 20
Line 66-67, Delete "Photo-polymerization initiator:" and insert the same Col. 20, Line 67, below "108° C." as a new Paragraph.

Column 23
Line 48, After ""33CN966J75"" insert -- . --.
Line 51, Delete "qtjar." and insert -- qt jar. --, therefor.
Line 56, Delete "80 C." and insert -- 80° C. --, therefor.
Line 57, After "solids)" insert -- . --.

Column 24
Line 7, Delete "(10 g)" and insert -- (100 g) --, therefor.

Signed and Sealed this

Twenty-second Day of July, 2008

JON W. DUDAS
*Director of the United States Patent and Trademark Office*